United States Patent
Stein et al.

(10) Patent No.: US 9,838,119 B1
(45) Date of Patent: Dec. 5, 2017

(54) AUTOMATICALLY STEERED OPTICAL WIRELESS COMMUNICATION FOR MOBILE DEVICES

(71) Applicant: Google Inc., Mountain View, CA (US)

(72) Inventors: Murphy Stein, Redwood City, CA (US); Antonio Bernardo Monteiro Costa, San Francisco, CA (US); Joshua Weaver, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 69 days.

(21) Appl. No.: 15/000,464

(22) Filed: Jan. 19, 2016

Related U.S. Application Data

(60) Provisional application No. 62/109,280, filed on Jan. 29, 2015.

(51) Int. Cl.
| | |
|---|---|
| *H04B 10/114* | (2013.01) |
| *G01S 5/16* | (2006.01) |
| *H04W 64/00* | (2009.01) |
| *G01S 5/00* | (2006.01) |
| *G01S 11/12* | (2006.01) |

(52) U.S. Cl.
CPC ........ *H04B 10/1143* (2013.01); *G01S 5/0027* (2013.01); *G01S 5/16* (2013.01); *G01S 11/12* (2013.01); *H04W 64/00* (2013.01)

(58) Field of Classification Search
CPC ......... H04B 10/11–10/116; G01S 5/00–5/009; G01S 5/16–5/163; G01S 17/46; G01S 11/12; H04W 64/00–64/006; G02B 7/32; G01C 3/08; G01C 3/10
See application file for complete search history.

(56) References Cited

U.S. PATENT DOCUMENTS

| | | | |
|---|---|---|---|
| 5,426,295 A | 6/1995 | Parikh et al. | |
| 6,804,465 B2 | 10/2004 | Volpi et al. | |
| 6,914,266 B2 | 7/2005 | Edwards et al. | |
| 7,409,159 B2 | 8/2008 | Izadpanah et al. | |
| 7,577,364 B2 | 8/2009 | Edwards et al. | |
| 8,125,371 B1 | 2/2012 | Daniel et al. | |
| 2005/0207758 A1* | 9/2005 | Edwards | H04B 10/1149 398/115 |

(Continued)

FOREIGN PATENT DOCUMENTS

| | | |
|---|---|---|
| EP | 1487136 A2 | 12/2004 |
| EP | 1327318 B1 | 5/2008 |
| WO | 02/086555 A2 | 10/2002 |

*Primary Examiner* — David Payne
*Assistant Examiner* — Casey Kretzer
(74) *Attorney, Agent, or Firm* — Brake Hughes Bellermann LLP

(57) ABSTRACT

A system and method for automatically steering an optical data signal from a transceiver of a base station to a selected mobile endpoint of a plurality of mobile endpoints in a virtual reality or an augmented reality space may include a tracking device that communicates with the base station to establish and track a current location of the selected mobile endpoint. A steering mechanism may steer an optical beam to the determined current location of the selected mobile endpoint and transmit the optical beam to the determined current location of the selected mobile endpoint to transmit an optical data signal to the selected mobile endpoint.

19 Claims, 11 Drawing Sheets

(56) References Cited

U.S. PATENT DOCUMENTS

| | | | |
|---|---|---|---|
| 2007/0031151 A1* | 2/2007 | Cunningham | H04B 10/1127 398/131 |
| 2007/0133798 A1* | 6/2007 | Elliott | H04B 10/70 380/255 |
| 2008/0146302 A1 | 6/2008 | Olsen et al. | |
| 2012/0262365 A1 | 10/2012 | Mallinson et al. | |
| 2013/0120763 A1* | 5/2013 | Grenet | G01C 3/085 356/615 |
| 2016/0072580 A1* | 3/2016 | Wabnig | H04B 10/70 398/131 |

* cited by examiner

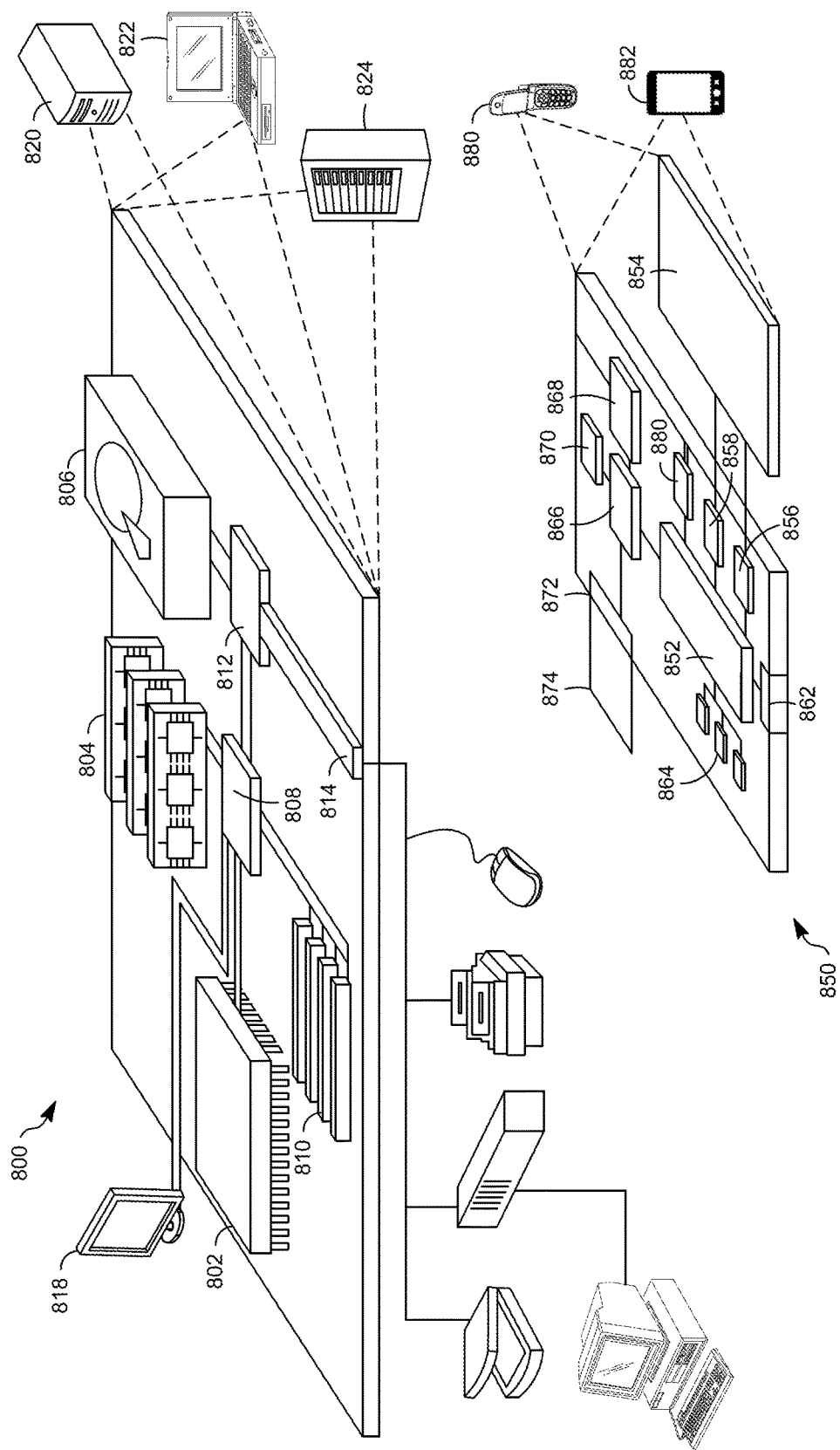

AUTOMATICALLY STEERED OPTICAL WIRELESS COMMUNICATION FOR MOBILE DEVICES

CROSS REFERENCE TO RELATED APPLICATIONS

This application claims the benefit of U.S. Provisional Application No. 62/109,280, entitled "Automatically Steered Optical Wireless Communication for Mobile Devices," filed on Jan. 29, 2015, which is hereby incorporated by reference in its entirety.

FIELD

This document relates, generally, to optical wireless communication for mobile devices.

BACKGROUND

Mobile interactive systems, such as, for example, virtual reality and augmented reality entertainment systems, may allow a user, or multiple users, to engage in an interactive, immersive experience using a mobile electronic device such as, for example, a handheld device and/or a head-mounted device. These mobile electronic devices may communicate with a base station to receive and transmit information and content to run various virtual reality or augmented reality applications on the mobile electronic devices as the user, or multiple users, move through a prescribed space in which the virtual reality or augmented reality system is running. As displays and applications associated with these types of mobile electronic devices running in these types of mobile entertainment systems become more sophisticated, data bandwidth requirements may increase accordingly, making it difficult to sustain reliable communication with the base station, particularly with multiple users accessing the same base station in the same space.

SUMMARY

In one aspect, a method of steering an optical data signal from a base station to a selected mobile endpoint of a plurality of mobile endpoints in a space may include determining a current location of the selected mobile endpoint, steering an optical beam to the determined current location of the selected mobile endpoint, and transmitting the optical beam to the determined current location of the selected mobile endpoint to transmit an optical data signal to the selected mobile endpoint.

In another aspect, a system for automatically steering a wireless optical signal may include a base station including a light source and a steering mechanism, and at least one mobile device located in a predetermined space and configured for wireless communication with the base station, the at least one mobile endpoint including a tracking device configured to receive an optical tracking signal from the light source of the base station, and to determine a current three dimensional position of the at least one mobile device in the predetermined space based on at least one component of the optical tracking signal sensed by tracking device, a transmitting device configured to transmit an optical data signal to the base station from the current three dimensional position of the at least one mobile device.

The details of one or more implementations are set forth in the accompanying drawings and the description below. Other features will be apparent from the description and drawings, and from the claims.

BRIEF DESCRIPTION OF THE DRAWINGS

FIG. 8 shows an example of a computer device and a mobile computer device that can be used to implement the techniques described herein.

DETAILED DESCRIPTION

Figure 1:
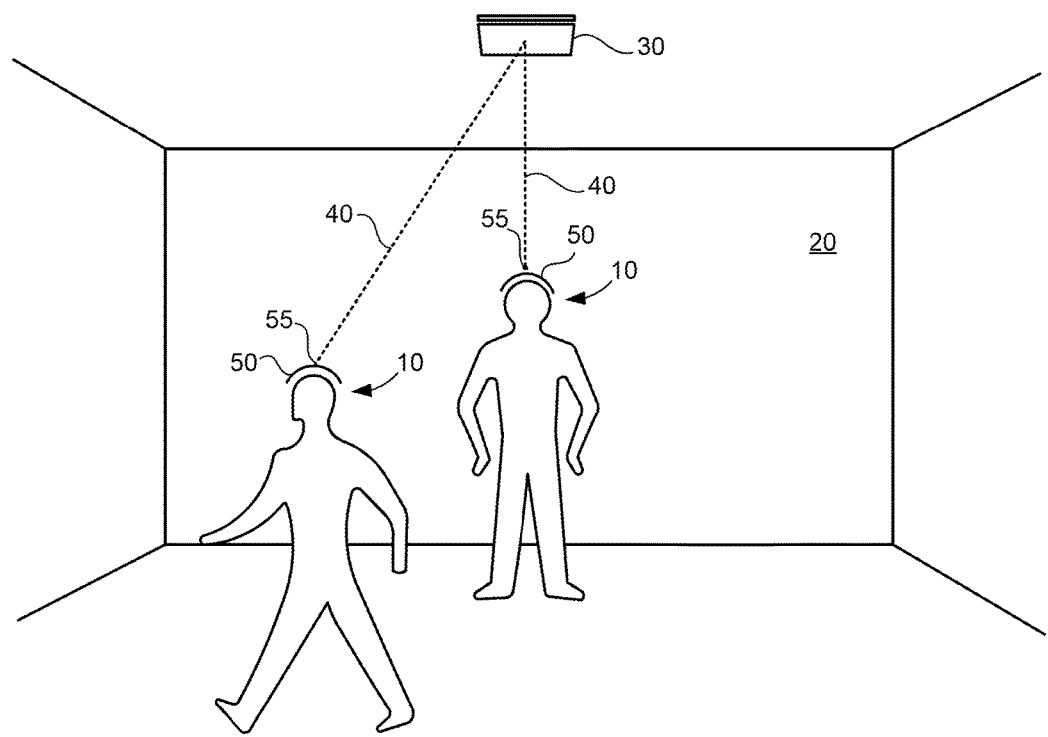
FIG. 1 illustrates an example of a system for automatic steering of optical wireless communication signals, in accordance with implementations described herein.

In a mobile interactive system, such as, for example, a virtual reality (VR) or an augmented reality (AR) entertainment system, or other system, multiple users or multiple mobile endpoints may rely on a central data feed for communication. For example, in a VR/AR entertainment system, multiple users may be equipped with, for example, a handheld electronic device, such as, for example, a smartphone including a display, and/or a head-mounted electronic device including a display, such as a headset. In this type of mobile interactive entertainment system, these mobile electronic device(s) may communicate with a base station to exchange information related to various application(s) running on the mobile electronic device(s). As capability and functionality of these types of mobile interactive entertainment systems continue to increase, display resolution and refresh rates continue to increase, and the systems are adapted to accommodate numerous simultaneous participants, data/bandwidth required to support these systems and the mobile interactive immersive experiences generated by these systems also continues to increase, in some instances beyond available resources.

In some implementations, each mobile electronic device may be connected to the base station by, for example, a cable. Connection via cable may provide reliable, essentially uninterrupted, and relatively rapid communication between the base station and the mobile electronic device(s). However, cables may become an obstruction and/or a limitation to free movement throughout the space in which the mobile electronic devices are being used to interact/engage with the VR/AR entertainment system, particularly when multiple users are in the same space, and engaged in the same (or different) immersive experience(s), particularly when the users move in the space while interacting with their particular application or game.

In some implementations, these types of mobile electronic devices may communicate with a transceiver coupled to the base station in a wireless manner, to eliminate the obstruction and/or limitation to free movement caused by cables. However, for transceivers broadcasting signals to the different mobile electronic devices in a multiplexed manner, the sharing of the transceiver's available bandwidth by all simultaneous, co-located users may cause delays in content delivery as the system is continually burdened. For example, when multiple mobile electronic devices communicate with a base station through a wireless transceiver, the bandwidth provided by the broadcasting transceiver may be insufficient to serve all of the mobile electronic devices adequately. As these types of interactive applications, such as, for example, VR/AR immersive experiences, movies and/or games, video teleconferencing and the like place an additional demand on content delivery, low latency in the display of new information in response to user actions becomes more important. When communicating in a wireless manner in this type of environment, wireless solutions such as WiFi or Bluetooth may also experience multipath phenomena, and/or interference with other devices in this environment, further degrading effective overall bandwidth.

Point-to-point, line-of-sight optical wireless communication may alleviate some of these issues. To facilitate this type of optical wireless communication between sending and receiving endpoints, the sending and receiving endpoints may be optically aligned, with the three dimensional location of the user receiving endpoint being initially located and then tracked as the user moves through the prescribed space relative to the sending endpoint. Techniques for quickly and accurately identifying 3D locations of user endpoints in the space, and responding to unpredictable user endpoint movements, may allow for automatically steering optical wireless communication signals to electronic devices in a multiple user, interactive mobile entertainment environment to facilitate optical wireless communication of data with the different devices. Once highly-accurate positional tracking of wireless transceivers on the mobile electronic devices is provided, point-to-point, line-of-sight optical wireless communication may be used to provide relatively high bandwidth communication with the multiple devices, which may be scaled to a large numbers of simultaneous users in the same space.

An example of a system for automatic steering of optical wireless communication for electronic devices, in accordance with implementations described herein, is shown in FIG. 1. In this example, a 3D position of a user receiving endpoint 10, or multiple user receiving endpoints 10, in a prescribed space 20 may first be located, and may then be tracked as each user receiving endpoint 10 moves in the space 20, so that the location of each user receiving endpoint 10 in the space 20 is essentially always known. A base station 30 may then relay information from, for example, a server or stationary computer, to a designated user receiving endpoint 10 whose location in the space 20 is known using, for example, a narrow beam 40 to transmit data to the designated user receiving endpoint 10. The user receiving endpoint 10 may transmit information back to the base station 30 independent from, or in response to, the information transmitted by the base station 30.

In some implementations, the 3D position of each of the multiple receiving endpoints 10 in the space 20 may be located/identified and then tracked as each of the receiving endpoints 10 moves in the space 20 using, for example, line-of-sight optical techniques. This may include, for example, a camera, associated with each of the user receiving endpoints 10, oriented into the space 20 to triangulate a position of each mobile endpoint 10 based on detection of markers affixed at known positions in the space 20, and/or a camera oriented into the space 20 to detect markers physically affixed to each of the user receiving endpoints 10 to determine a position of each of the user receiving endpoints 10.

Figure 2A:
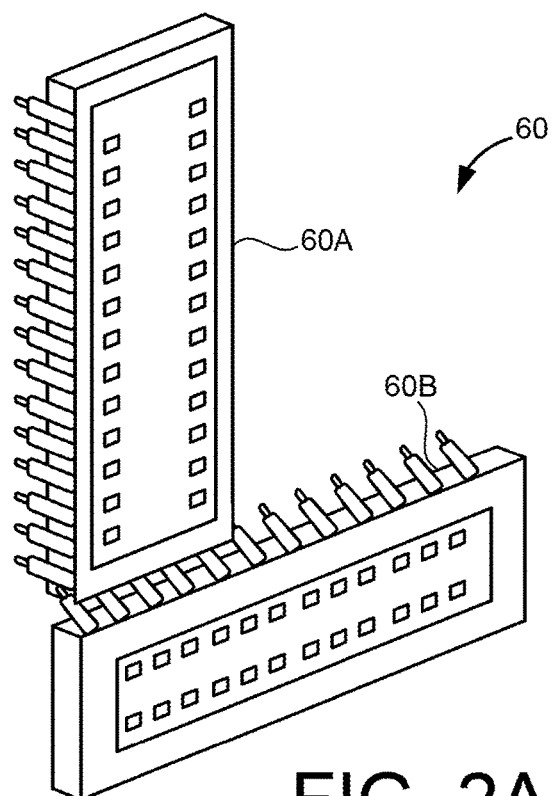
FIGS. 2A-2D are views of an example of a tracking device included in the example system shown in FIG. 1, in accordance with implementations described herein.
Figure 2C:
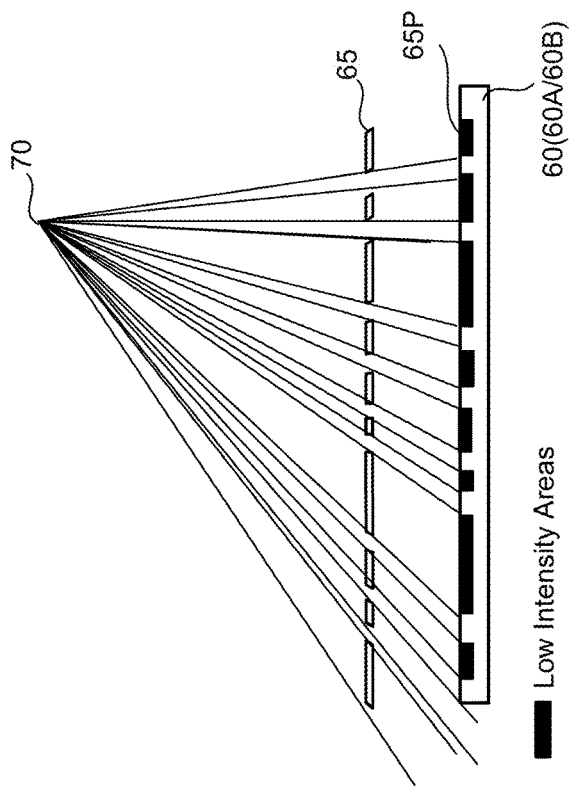
Figure 2B:
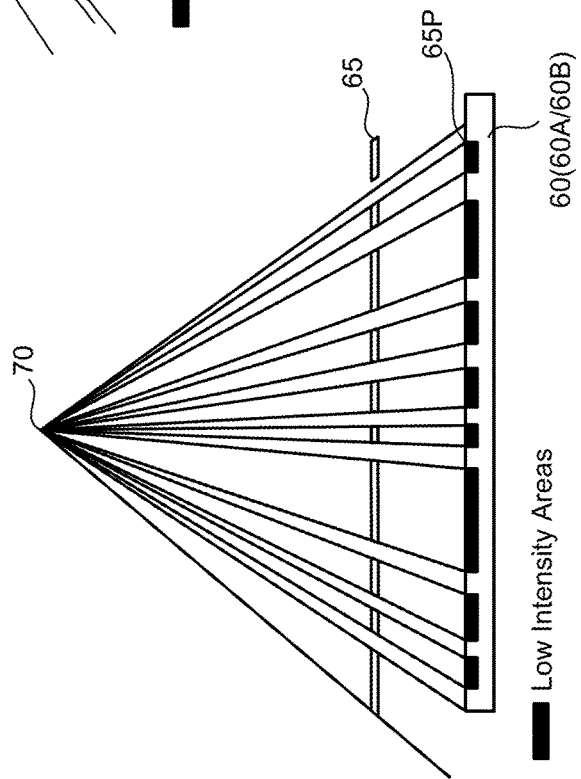

In some implementations, the 3D position of each of the user receiving endpoints 10 (hereinafter, also referred to as "mobile endpoints 10") in the space 20 may be located/identified and then tracked as the mobile endpoints 10 move in the space 20 using, for example, a wide angle light source oriented into the space 20 to modulate, or flicker, light into the space 20. As shown in FIG. 2A, one or more linear photo diode arrays 60 may be associated with each of the mobile endpoints 10. In particular, in the example implementation shown in FIGS. 2A-2C, first and second photo diode arrays 60A and 60B each have a barrier or mask 65 positioned at a given offset with respect to its respective linear photo diode array 60A and 60B. A light source 70 oriented into the space 20 may cast a flickering shadow on, for example, the first photo diode array 60A, as shown in FIG. 2B. Due to the positioning of the first mask 65 relative to the first photo diode array 60A, the detected position of the shadow cast by the light may be proportional to the offset of the first mask 65 in a given direction, for example, the longitudinal direction of the first photo diode array 60A. As the pattern of the openings in the mask 65, and the shadow cast by light directed through the openings in the mask from a light source directly across from, or orthogonal to the array 60A, are known, this measure may provide a first constraint in determining the 3D position of the mobile endpoint (associated with the first linear photo diode array 60A) in the space 20. As the mobile endpoint 10, and first photo diode array 60A, moves in the space 20 relative to the light source 70, as shown in FIG. 2C, the shadow cast onto the photo diode array 60A through the openings in the mask 65 shifts, altering the illumination pattern on the photo diode array 65A, the changes in the illumination pattern 65P allowing for the tracking of movement in the space 30.

If the second linear photo diode array 60B is positioned proximate the first linear photo diode array 60A, for example, orthogonal to the first photo diode array 60B as in the example implementation shown in FIG. 2A, with the second mask 65 positioned at an offset with respect to the second photo diode array 60B, a second constraint in determining the 3D position of the mobile endpoint 10 in the space 20 may be determined in a similar manner. By determining a size of the shadow, a third constraint in determining the 3D position of the mobile endpoint 10 in the space 20 may be determined. In some implementations, these factors may be combined to determine the 3D position of the mobile endpoint 10 in the space 20, and to track and update the 3D position of the mobile endpoint 10 as the endpoint 10 moves in the space 20. In particular, as shown in FIGS. 2B-2C, the mask 65 may be positioned at a given offset from the linear photo diode array 60. Illumination provided by the light source 70 casts a flickering shadow onto the linear photo diode array 60, resulting in the illumination pattern 65P cast on the linear photo diode array 60. This illumination pattern 65P may be detected by the linear photo diode array 60, and changes in the illumination pattern 65P, compared to the known pattern of light through the openings in the mask 65, and sequentially compared to a previous illumination pattern 65P, may be used to determine a position and tracking based on the first and second constraints referenced above.

In some implementations, this determination of the current 3D position of the mobile endpoint 10 in the space 10, and/or the tracking of movement of the mobile endpoint 10 in the space 20, may be carried out by the base station 30, based on information collected in the manner described above and transmitted back to the base station 30. In some implementations, this determination of the current 3D position of the mobile endpoint 10 in the space 10, and/or the tracking of movement of the mobile endpoint 10 in the space 20, may be carried out by the mobile device (e.g., the headset 50), based on information collected in the manner described above, with positional information and tracking information of the mobile endpoint 10 transmitted back to the base station 30 by, for example, a transmitting device 50 of the headset 50.

Figure 2D:
Figure 2D:
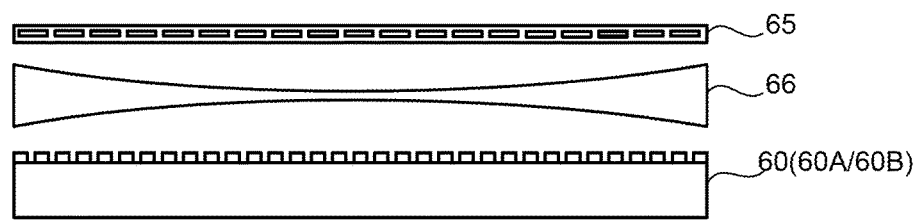

In some implementations, a diverging lens 66 may be positioned between the mask 65 and the photo diode array 60, as shown in FIG. 2D. Placement of a diverging lens 66 between the mask 65 and the photo diode array 60 may magnify the pattern onto the photo diode array 60, which may improve the signal when the light source 70 is relatively far from the photo diode array 60. This magnification of signal by the diverging lens 66 may also facilitate detection of smaller magnitude changes in position than the changes that could otherwise be detected simply based on the pitch between the photo elements of the photo diode array 60.

Figure 3:
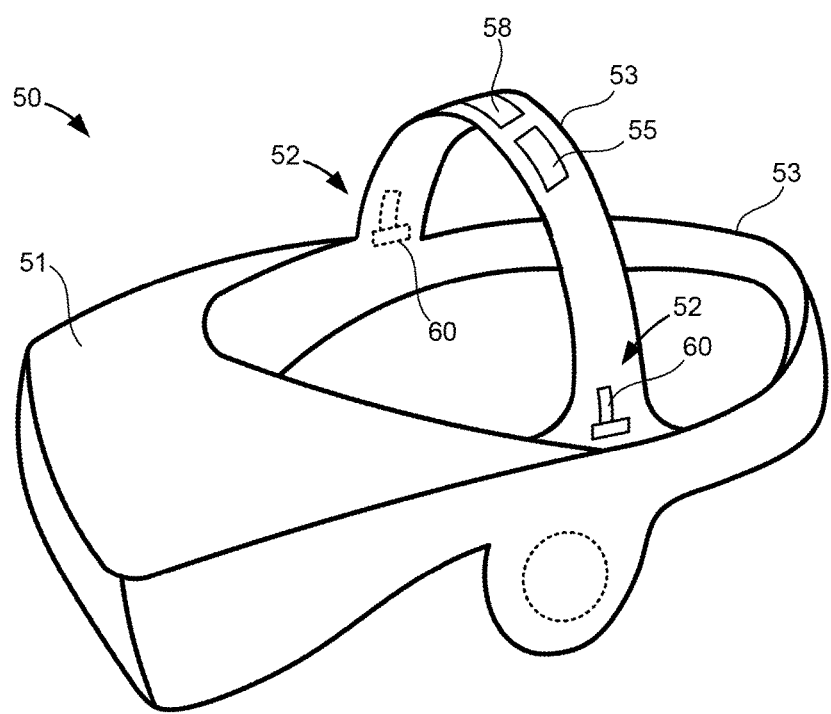
FIG. 3 is a perspective view of an example of a mobile electronic device operable in the example system shown in FIG. 1, in accordance with implementations described herein.

In some implementations, the determination of the 3D position of the mobile endpoint 10 in the space 20 based on these first, second and third constraints may be made by the mobile electronic device, which may be, for example, worn by the user, such as, for example a headset 50 worn on the head of the user as shown in the example implementation of FIG. 1, and shown in more detail in FIG. 3, and/or which may be a handheld device that is held by the user. In some implementations, the determination of the 3D position of the mobile endpoint 10 in the space 20 based on these first, second and third constraints may be made by the base station 30 and/or a server or external computing device in communication with the base station 30.

In some implementations, instead of a mask positioned at an offset with respect to the linear photodiode array, a material such as, for example, a piece of glass or other such material may be positioned with respect to the linear photodiode array to create a caustic which concentrates light spatially in some fixed pattern. This fixed pattern may then be detected by the respective linear photodiode arrays as previously described to derive first, second and third constraints of the 3D position. Other methods for determining these constraints and the associated 3D position may also be appropriate, depending on a particular implementation.

This is just one example of how a 3D position of one or more mobile user endpoints may be initially identified and tracked in this implementation, simply for ease of discussion and illustration. In other implementations, other ways for identifying and tracking 3D positions of mobile user endpoints may also be applied based on environmental factors, number of mobile user endpoints in a particular environment, system requirements, available resources and other such factors.

Hereinafter, an example implementation of a mobile electronic device including the headset 50 worn on the head of the user will be presented, simply for ease of discussion and illustration. However, the principles discussed herein may also be applied to other mobile electronic devices, such as handheld devices capable of generating VR/AR immersive experiences in a mobile entertainment environment, or other environment in which multiple mobile users in an interactive data environment rely on centralized data communication.

As shown in the example implementation of FIG. 3, a headset 50 may include a housing 51 in which various components, such as, for example, various optical elements and a processor, may be disposed. The housing 51 may be coupled to a frame 53 to be fitted on the head of the user. A user tracking device 52 may be provided on the headset 50 (or other mobile electronic device as discussed above) to facilitate the identification and tracking of the particular mobile user endpoint 10 wearing the headset 50. As shown in the example of FIG. 3A, in one implementation, the user tracking device 52 may include, for example, a pair of linear photo diode arrays 60, oriented perpendicular to each other and located on the headset 50 to be worn by the user. In some implementations, the user tracking device 52 may include a first pair of linear photo diode arrays 60 located on a first side of the headset 50, and a second pair of linear photo diode arrays 60 located on a second side of the headset 50, to provide for enhanced recognition and tracking capability as the user moves and changes orientation in the space. A first pair of masks 65 (not separately illustrated in FIG. 3) may be positioned at an offset with respect to the first pair of linear photo diode arrays 60, and a second pair of masks 65 (not separately illustrated in FIG. 3) may be positioned at an offset with respect to the second pair of linear photo diode arrays 60. As light is modulated into the space by the light source 70, shadows and/or patterns detected by the photo diode arrays 60 may be used to determine corresponding current 3D position of the photo diode arrays 60, and the associated mobile user endpoint 10, in the space 20, in the manner described above. The light modulated into the space 20 and received by the photo diode arrays 60 for location and tracking of the user may be modulated in to the space 20 by, for example, a light source provided in the base station 30, or a light source separately mounted in the space 20 and in communication with the base station 30 and the headset 50.

In some implementations, the user tracking device 52 may be located at other positions on the headset 50. For example, the user tracking device 52 may be located at a top portion of the frame 53, or at a rear portion of the frame 53, or on a portion of the housing 51. A position for the user tracking device may be established to facilitate communication with the light source 70 so that the 3D position of the mobile user endpoint 10 in the space 20 may be accurately and efficiently identified and tracked as the user moves in the space 20. In some implementations, the user tracking device 52 may be provided at multiple locations, as shown in FIG. 3. In some implementations, the user tracking device 52 may be provided at a single location.

In some implementations, the base station 30 may include a steering mechanism, which may orient the transmission of information from the base station 30 to the mobile receiving endpoint(s) 10 using, for example, an optical beam 40 directed to a specifically intended user receiving endpoint 10 based on the identified/tracked location. As shown in the example implementation of FIG. 1, the base station 30 may positioned on a ceiling surface of the space 20 in which the mobile user endpoints 10 are located, with the user tracking devices 52 located on head-mounted electronic devices, or headsets 50, worn by each of the plurality of users serviced by the base station 30. This example arrangement is shown simply for ease of discussion and illustration. Other arrangements and/or locations for the base station 30 and/or the user tracking devices 52 may also be appropriate in other implementations. For example, rather than a single base station, in some implementations, multiple (smaller) base stations may be positioned throughout the space, avoiding interference through the use of automatically steered narrow optical beams. In some implementations, the user tracking devices may be worn or positioned on another part of the user's body, or held or attached to a handheld device.

Figure 4A:
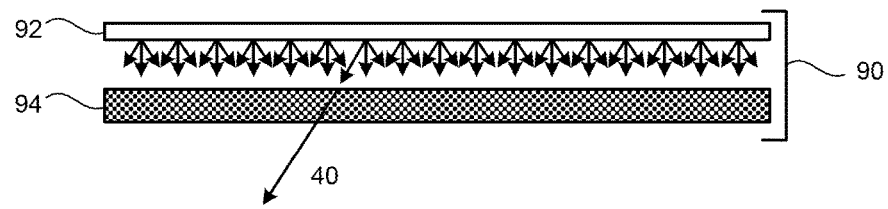
FIGS. 4A and 4B illustrate examples of a steering system included in the example system shown in FIG. 1, in accordance with implementations described herein.
Figure 4B:
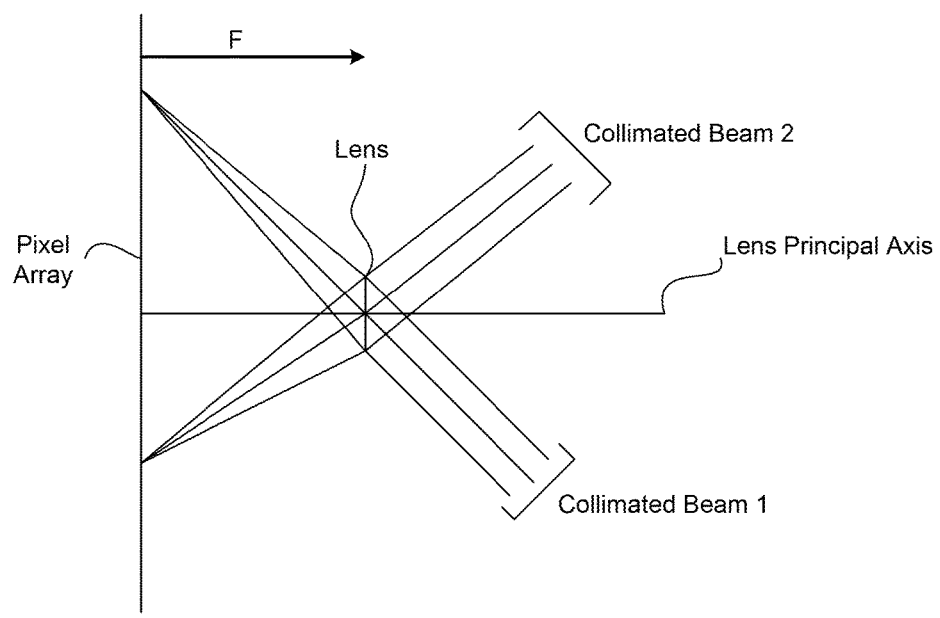

Once the 3D location of the mobile endpoint is known and can be tracked in, for example, the manner described above, data may be transmitted from the base station 30 to the mobile endpoint 10 by, for example, modulating an optical beam 40 generated by a light source at the base station 30 toward the mobile endpoint 10. In some implementations, this may include, for example, rotating a first single axis mirror about a first axis and a second single axis mirror about a second axis to specific position(s) to beam a ray 40 generated by the light source towards a specific, intended 3D endpoint 10. Alternatively, in some implementations, this may include, for example, rotating a single mirror about a first axis and a second axis to beam a ray 40 generated by the light source towards a specific, intended 3D endpoint. In some implementations, this may include, for example, controlling individual pixels of an emitter 92 of a spatial light modulator ("SLM") 90 that modulates the beam 40 to control an angle of the beam 40 reflected from the SLM 90. The SLM may be positioned in conjunction with optical elements 94, such as, for example, various optical filters, to provide a collimated beam 40 toward a specific, intended 3D endpoint 10, as shown in FIG. 4A. In some implementations, a light emitting pixel array such as an LCD or OLED, or VCSEL laser array panel may be placed behind a collimating lens at the focal distance, as shown in FIG. 4B. By dynamically selecting a single pixel of the array, a directed collimated beam may be steered towards the target relatively rapidly. In some implementations, larger beams with greater diameter maybe created using groups of co-located pixels. Multiple targets maybe illuminated simultaneously in this fashion from a single array without moving parts, making more efficient user of light than the SLM shown in FIG. 4A.

In some implementations, this optical beam 40 may be generated by a spin laser, which may follow an intended mobile user endpoint 10 along its 3D location in the space 20 to transmit data to the intended mobile user endpoint 10, at a significantly enhanced modulation speed. As noted above, the direction of the beam provided by the spin laser may be steered by, for example mechanical rotation of a two or more mirrors, or a high density spatial light modulator. In some implementations, a beam generated by a single laser may be multiplexed to the locations of multiple different devices, so that the single beam may be capable of supporting/transmitting data to multiple mobile user endpoints 10 in the space 20.

As noted above, in some implementations, multiple base stations may be positioned at different locations in the space. In some of these implementations, each of these multiple base stations may include one or more lasers. This positioning of multiple lasers throughout the space may allow for support of each of the multiple mobile user endpoints in the space to be passed from one base station to another, and one laser to another, as the user endpoint moves through the space, so that a line-of-sight may be maintained between each of the multiple mobile user endpoints and one of the multiple base stations positioned in the space. This type of arrangement may avoid signal occlusion as the multiple user endpoints move through the space, and/or data collision as the multiple user endpoints move through the space. In some implementations, the base stations may also function as relays, handing off optical communication with a particular mobile user endpoint from one base station to another as the mobile user endpoint moves in the space.

In some implementations, multiple base stations may work together with the optical beam to extend the range of the optical signal. For example, in some implementations, a first base station may have a wired data connection and may be in communication with a particular mobile user endpoint. As the user moves through the space, for example, in a direction away from the first base station, or to an area that is blocked or obscured or occluded from the first base station, the first base station may aim the optical beam at a second base station. The second base station may receive the optical beam from the first base station and steer the received optical beam to the user. In this example, the second base station may not necessarily need a wired data connection.

In some implementations, the second base station may essentially function as a smart mirror, in that the second base station may simply receive and redirect, or bounce, the optical beam emitted by the first base station to the intended user. In some implementations, the second base station may receive an optical beam from the base station as the user moves in the space, in a direction away from the first base station or a position that is blocked or obscured from the first base station, process the data included in the optical beam, and generate and steer a new optical beam to the user, functional as a signal booster and providing extended range for the optical signal.

In some implementations, one or more of the multiple base stations may include a second emitter having a static transmission angle, forming a chain of base stations. In this chain of base stations, the second optical signal may provide a network backbone, transmitting high bandwidth data from one base station to the next. For example, in some implementations, a line of base stations may be mounted along a central portion of the ceiling of a relatively large room. A base station at a proximal end of this chain may have a wired data connection, and may relay information along the chain of base stations, with each base station using its primary optical path to aim optical data signal(s) to respective mobile user endpoints.

In some implementations, a user receiving device 55 may also be included on the headset 50. After the position of a particular user endpoint 10 is identified and tracked by the light modulated into the space and received by the tracking device 52 including the photo diode array(s) as described above, the user receiving device 55 may receive and process data transmitted to the mobile user endpoint 10 by the optical beam 40 generated by the base station 30. In the example implementation shown in FIG. 3, the user receiving device 55 is shown on an upper portion of the frame 53 of the headset 50. However, the user receiving device 55 may be positioned at other locations on the headset 50, such as, for example, a side or rear portion of the frame 53, or a portion of the housing 51. In some implementations, the user tracking device 52 and the user receiving device 55 may be included as a single unit capable of processing both user location and also data received from the base station 30 via the optical beam 40. In some implementations, the user tracking device 52 and/or the user receiving device 55 may be worn or positioned on another part of the user's body, or held or attached to a handheld device, at a position at which it is capable of transmitting information from the received optical signal to the processor of the mobile electronic device, such as the headset 50.

The headset 50 may also include a user transmitting device 58 to transmit information from a corresponding mobile user endpoint 10 back to the server or stationary computer via the base station 30 by, for example, encoding signals in a radio, microwave or infrared signal, generated by the user transmitting device 58, back toward the base station 30 in a coded fashion. In the example implementation shown in FIG. 3, the user transmitting device 58 is included on a top portion of the frame 53 of the headset 50. However, as with the user tracking device 52 and the user receiving device 55, the user transmitting device 58 may be positioned at other locations on the headset 50, such as, for example, a rear portion or side portion of the frame 53 of the headset 50 or on the housing 51. In some implementations, like the user tracking device 52 and the user receiving device 55, the user transmitting device 58 may be worn or positioned on another part of the user's body, or held or attached to a handheld device, at a position at which it is capable of transmitting information from the processor of the mobile electronic device, such as the headset 50, to the base station 30. To allow for full duplex communication, providing for communication in both directions simultaneously (from base station 30 to mobile user endpoint 10 and from mobile user endpoint 10 to base station 30), light transmitted from the mobile user endpoint 10 may utilize a different frequency from the beams transmitted from the base station 30 to the mobile user endpoint 10.

In some implementations, the electromagnetic frequency utilized to optically transmit data from the base station 30 to the receiving devices 55 of the mobile endpoints 10, and/or to optically transmit data from the transmitting devices 58 of the mobile endpoints 10 to the base station 30, may be in the infrared range, so as to not be visible to the naked eye.

In some implementations, a mirror, for example, a hemispherical mirror, may surround light sensor(s) of the user receiving device 55 at which beam(s), or optical signals, from the base station 30 are received, so that light received at the receiving device 55 of the mobile user endpoint 10 may enter the light sensor(s) of the user receiving device 55, but not be reflected back out.

In some implementations, the beam 40 transmitting an optical signal from the base station 30 to one of the mobile endpoints 10 in the space 20 may be relatively narrow, such as, for example, less than 2.0 mm. In some implementations, the relatively narrow beam 40 may have a relatively minimal spread as the beam propagates through the space 20. In some implementations, the diameter of the beam may be, for example, less than 5.0 mm at the mobile endpoint 10. In some implementations, the beam diameter may be greater than 5.0 mm to facilitate the beam 40 reaching the intended mobile endpoint 10 without unnecessarily high accuracy in locating the user receiving device 55 worn by the mobile user endpoint 10. In general, the number of mobile user endpoints 10 in the same space 20 may impact the effective beam diameter, because small diameters may be needed to avoid cross-talk between many different mobile endpoints, but larger diameter beams may be used when cross-talk is less of a concern.

A method of automatically steering a wireless optical signal to one or more electronic devices, in accordance with implementations described herein, will be discussed with respect to FIGS. 7A and 7B. The method shown in FIGS. 7A and 7B may provide of automatic steering of an optical wireless signal from a base station, such as, for example, the base station 300 shown in FIG. 6, to one or more mobile electronic display devices in a prescribed space, such as, for example, the mobile electronic display device 500, such as a headset 500, shown in FIG. 5.

Figure 5:
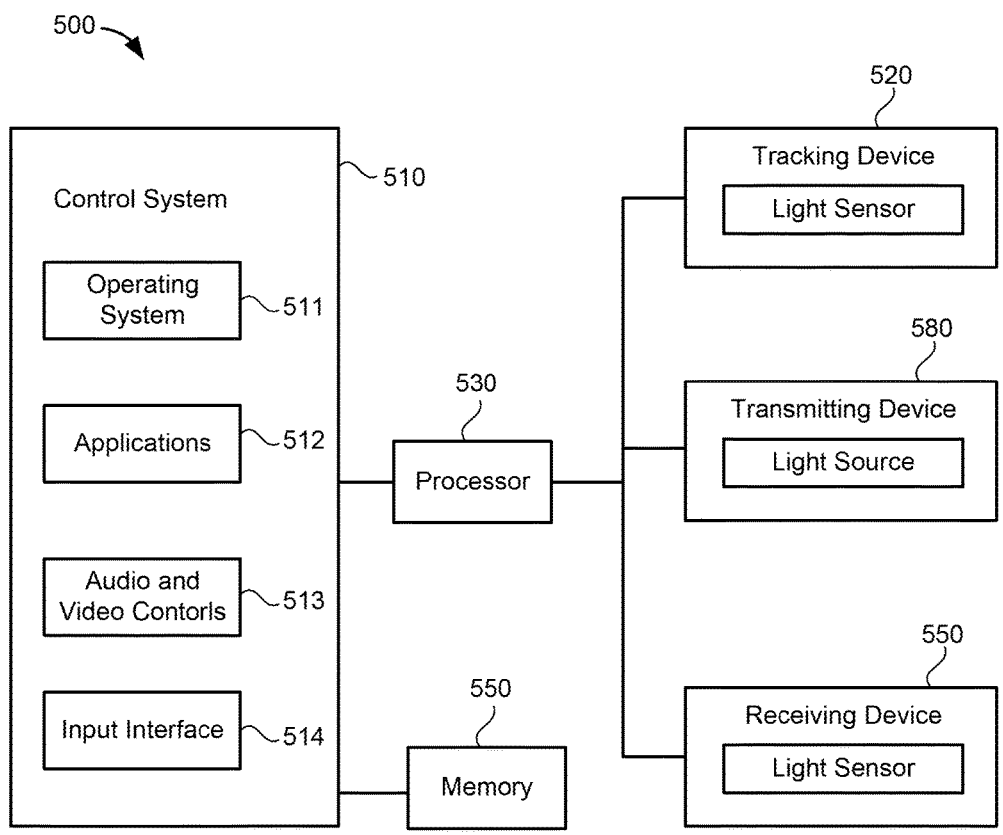
FIG. 5 is a block diagram of an example mobile electronic device operable in the example system shown in FIG. 1, in accordance with implementations described herein.

The headset 500 shown in FIG. 5 may include a user tracking device 520 to facilitate initial location and tracking of the electronic device in the prescribed space based on an optical tracking signal from the base station 300 or other light source, a receiving device 550 that receives optical data signals from the base station 300, and a transmitting device 580 that transmits optical data signals to the base station 300. The headset 500 may also include a control system 510 including an operating system 511, various applications 512 to be run by the headset 500 together with data received from the base station 300, audio and video control algorithms 513, and an input interface 514 capable of receiving external input, and a memory 515 accessible to the control system 510, with a processor 530 operably coupling the components of the control system 510 to the tracking device 520, transmitting device 580 and receiving device 550.

Figure 6:
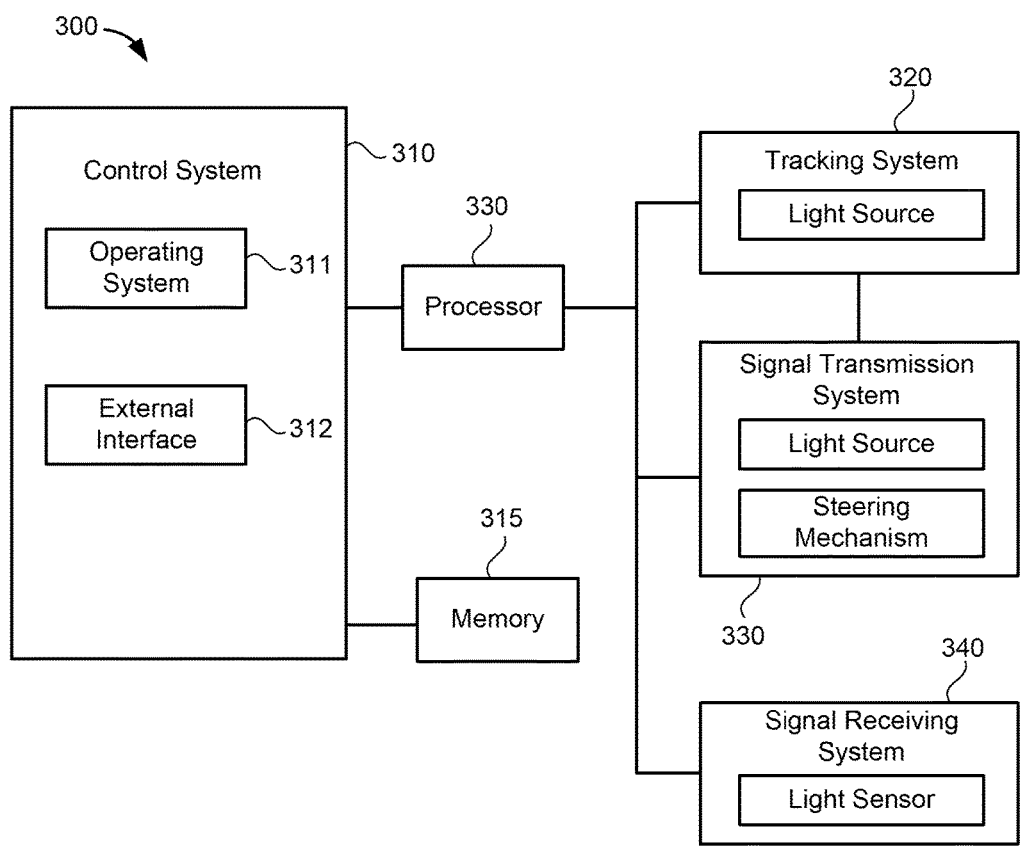
FIG. 6 is a block diagram of an example base station operable in the example system shown in FIG. 1, in accordance with implementations described herein.

The base station 300 shown in FIG. 6 may include a tracking system 320 that generates optical tracking signals to be received by the tracking device 520 of the headset 500 to facilitate initial location and tracking of the electronic device in the prescribed space, a signal transmission system 330 that transmits optical data signals to the receiving device 550 of the headset based on data received from an external server or computing system, the signal transmission system 330 including a light source that generates an optical beam corresponding to the optical data signal, and a steering mechanism that steers or directs the optical beam corresponding to the optical data signal to the receiving device 550 of the headset 500 based on the location of the headset 500 established by the tracking device 520 and the tracking system 320. The base station may also include a control system including an operating system 311 and an external interface 312 to facilitate interface with various external devices such as, for example, an external server and/or separate computing system, and a memory 315 accessible to the control system 310, with a processor 330 operably coupling the components of the control system 310 to the tracking system 320, the signal transmission system 330 and the signal receiving system 340.

Figure 7A:
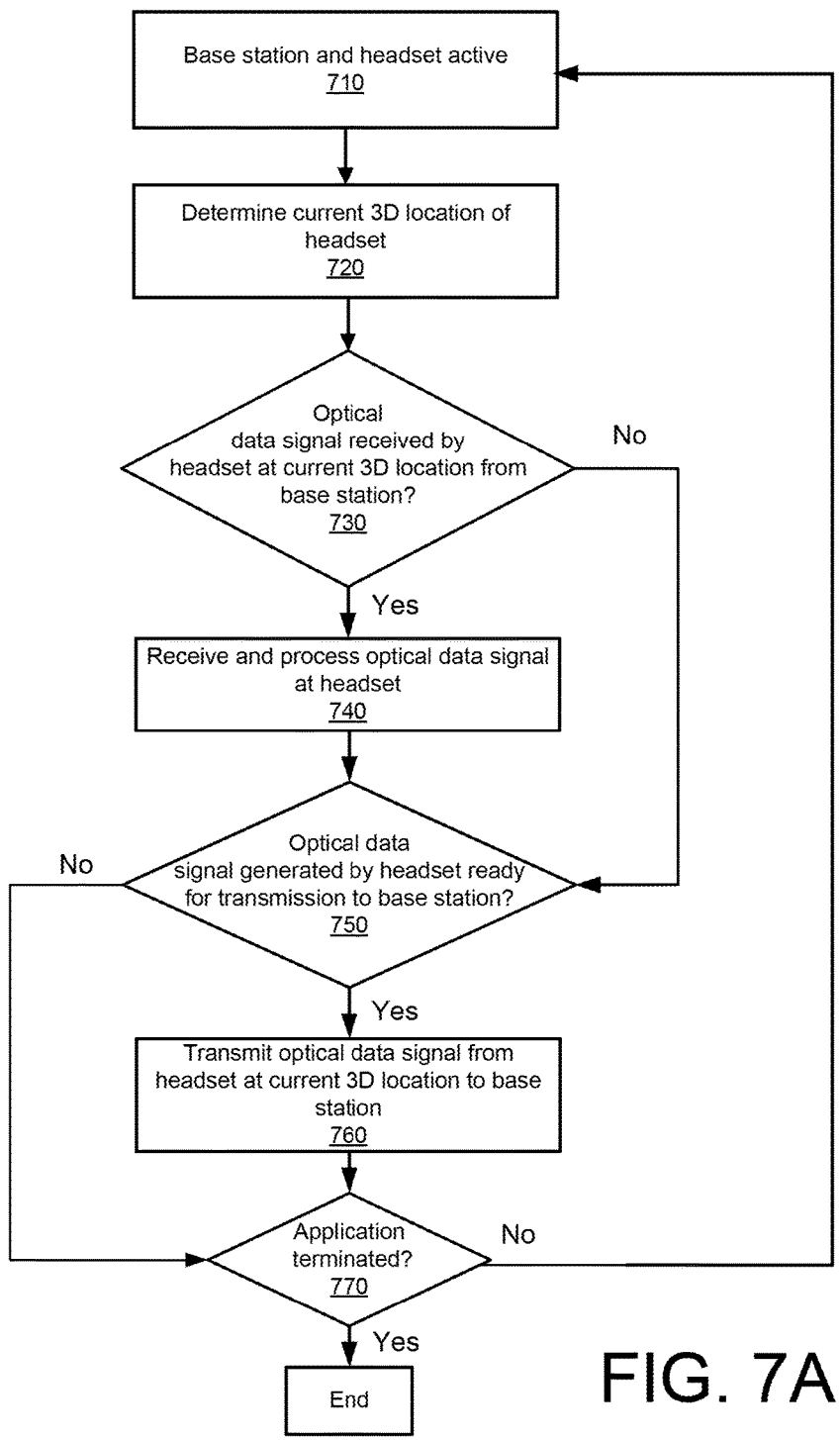
FIGS. 7A and 7B are flowcharts of a method of automatically steering wireless optical communication signals, in accordance with implementations described herein.

In the method 700 shown in FIG. 7A, once it is determined at block 710 that the base station and at least one mobile electronic display device, such as, for example, a headset, is active in the designated space, a 3D location of the at least one headset in the space is determined at block 720. The 3D location of the at least one headset in the space may be initially determined based on an optical tracking signal received by a tracking device included on the headset, and may be determined by a processor of the headset and/or a processor of the base station, as described in detail above. The location of the headset may then be substantially continuously tracked based on a periodic continued optical tracking signal received by the tracking device of the headset. This will be described in more detail in FIG. 7B.

When it is determined at block 730 that an optical data signal has been received by the headset from the base station, the optical data signal is received and processed by the headset at the headset's current location at block 740. When it is determined at block 750 that an optical data signal is ready for transmission from the headset to the base station, the optical data signal is transmitted from the headset, at the headset's current location, to the base station at block 760. In the example implementation shown in FIG. 7A, the receipt and processing of the optical data signal from the base station to the headset in blocks 730 and 740, and the generation and transmission of the optical data signal from the headset to the base station in blocks 750 and 760 are shown in parallel. However, as described in detail above, in a system and method as broadly described herein, these processes may be carried out in parallel, or simultaneously, so that the headset may receive optical data signal(s) from the base station while simultaneously transmitting optical data signal(s) to the base station. The process continues until it is determined at block 770 that an active application has been terminated.

Figure 7B:
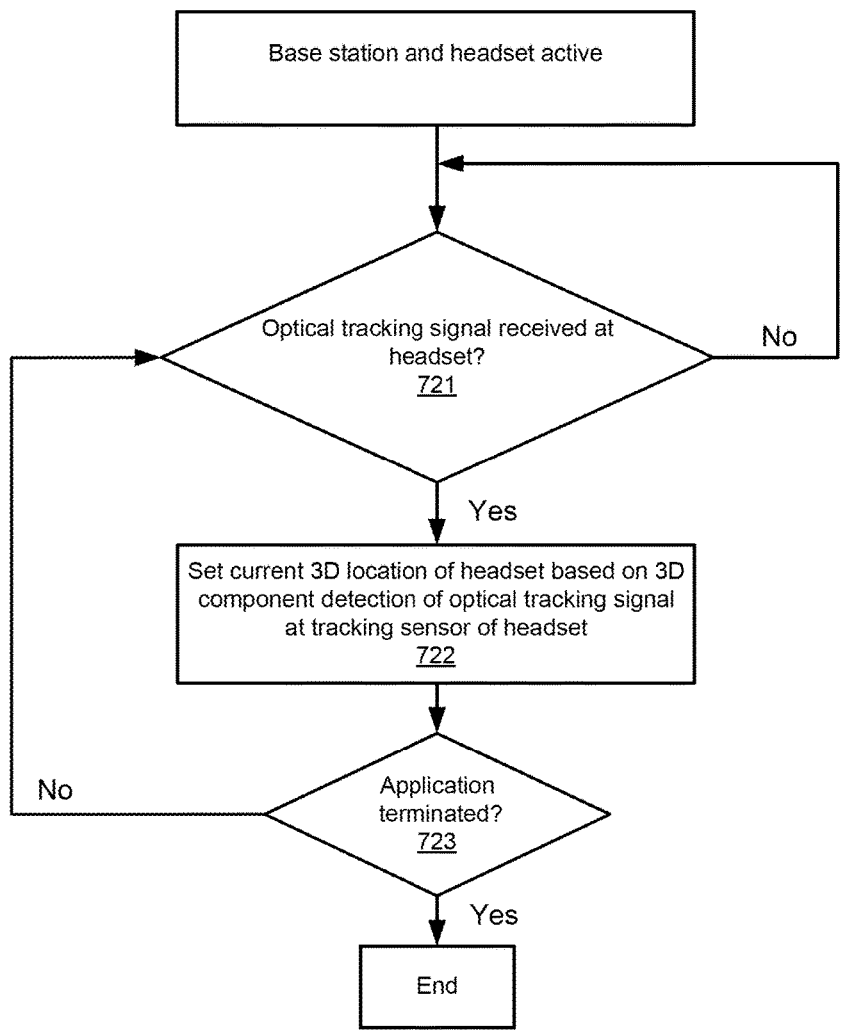

FIG. 7B provides a more detailed explanation of the determination of the current 3D location of the headset in the prescribed space at block 720 of FIG. 7A. As shown in FIG. 7B, when it is determined that an optical tracking signal has been received at the headset at block 721, the current location of the headset is determined, in some implementations, by the headset, based on a sensing of a current optical tracking signal by the tracking device of the headset, at block 722. As described in detail above, the tracking device may include one or more pairs of linear photo diode arrays which, when coupled with one or more corresponding offset masks, may be used to determine a current location of the headset based on the shadow cast on the each linear photo diode array by its corresponding mask. This process is repeated, substantially continuously, until it is determined at block 723 that an active application has been terminated.

The system and method for automatic steering of optical wireless communication systems has been described herein with respect to a VR/AR interactive entertainment system, simply for ease and clarity of discussion and illustration. However, the system and method for automatic steering of optical wireless communication, as embodied and broadly described herein, may also be applied to other systems, such as, for example, a workplace environment, a training environment, a classroom environment, and other such applications and/or implementations involving data transceiving between one or more base stations and multiple mobile user endpoints. Additionally, the system and method for automatic steering of optical wireless communication has been described herein with respect to a space in which the system operates. This space may be an indoor space or an outdoor space, or any space equipped so that the system may operate as described.

In a system and method for automatic steering of optical wireless communication signals for mobile electronic devices, in accordance with implementations described herein, a three dimensional position of each of a plurality of multiple mobile user endpoints in the same space may be initially and then tracked as each mobile user endpoint moves in the space. As each mobile user endpoint moves in the space, a base station may transmit an optical data signal to a selected mobile user endpoint at its known current position using a modulated beam of light, generated, in some implementations, by a laser. Each mobile user endpoint may transmit optical data signals to the base station using a modulated light signal received by the base station. This arrangement, and variations thereof, allow for efficient, reliable exchange of data between the base station and the plurality of mobile user endpoints located in the same space, and/or the efficient, reliable exchange of data between multiple base stations and multiple mobile user endpoints in the same space.

FIG. 8 shows an example of a generic computing device 800 and a generic mobile electronic computing device 880, illustrating some of the components of such computing devices. Computing device 800 is intended to represent various forms of digital computers, such as laptops, desktops, workstations, personal digital assistants, servers, blade servers, mainframes, and other appropriate computers, which may be in communication with the base station described herein and/or which may function as the base station described herein. Mobile electronic computing device 880 is intended to represent various forms of mobile devices, such as personal digital assistants, cellular telephones, smart phones, and mobile electronic display devices such as the head-mounted display system described herein. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 880. Each of such devices may contain one or more of computing device 800, 880, and an entire system may be made up of multiple computing devices 800, 880 communicating with each other.

Computing device 880 includes a processor 882, memory 864, an input/output device such as a display 884, a communication interface 866, and a transceiver 868, among other components. The device 880 may also be provided with a storage device, such as a microdrive or other device, to provide additional storage. Each of the components 880, 882, 864, 884, 866, and 868, are interconnected using various buses, and several of the components may be mounted on a common motherboard or in other manners as appropriate.

The processor 882 can execute instructions within the computing device 880, including instructions stored in the memory 864. The processor may be implemented as a chipset of chips that include separate and multiple analog and digital processors. The processor may provide, for example, for coordination of the other components of the device 880, such as control of user interfaces, applications run by device 880, and wireless communication by device 880.

Processor 882 may communicate with a user through control interface 888 and display interface 886 coupled to a display 884. The display 884 may be, for example, a TFT LCD (Thin-Film-Transistor Liquid Crystal Display) or an OLED (Organic Light Emitting Diode) display, or other appropriate display technology. The display interface 886 may comprise appropriate circuitry for driving the display 884 to present graphical and other information to a user. The control interface 888 may receive commands from a user and convert them for submission to the processor 882. For example, the control interface 888 may receive in input entered by a user via, for example, the virtual keyboard 280 displayed by the display 884 including the touchscreen display device 200 described above, and transmit the input to the processor 882 for processing, such as, for entry of corresponding text into a displayed text box. In addition, an external interface 862 may be provide in communication with processor 882, so as to enable near area communication of device 880 with other devices. External interface 862 may provide, for example, for wired communication in some implementations, or for wireless communication in other implementations, and multiple interfaces may also be used.

The memory 864 stores information within the computing device 880. The memory 864 can be implemented as one or more of a computer-readable medium or media, a volatile memory unit or units, or a non-volatile memory unit or units. Expansion memory 874 may also be provided and connected to device 880 through expansion interface 872, which may include, for example, a SIMM (Single In Line Memory Module) card interface. Such expansion memory 874 may provide extra storage space for device 880, or may also store applications or other information for device 880. Specifically, expansion memory 874 may include instructions to carry out or supplement the processes described above, and may include secure information also. Thus, for example, expansion memory 874 may be provide as a security module for device 880, and may be programmed with instructions that permit secure use of device 880. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 882, that may be received, for example, over transceiver 868 or external interface 862.

Device 880 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 880, which may be used as appropriate by applications running on device 880.

Device 880 may also communicate audibly using audio codec 860, which may receive spoken information from a user and convert it to usable digital information. Audio codec 860 may likewise generate audible sound for a user, such as through a speaker, e.g., in a handset of device 880. Such sound may include sound from voice telephone calls, may include recorded sound (e.g., voice messages, music files, etc.) and may also include sound generated by applications operating on device 880.

The computing device 880 may be implemented in a number of different forms, as shown in the figure. For example, it may be implemented as a cellular telephone 880. It may also be implemented as part of a smart phone 882, personal digital assistant, a mobile head-mounted display device, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of steering an optical data signal from a base station to a selected mobile endpoint of a plurality of mobile endpoints in a space, the method comprising:
   determining a current location of the selected mobile endpoint, including:
      receiving an optical tracking signal at a tracking device of the selected mobile endpoint;
      determining a first component of a three dimensional location of the selected mobile endpoint in the space based on a shadow cast by the optical tracking signal in a longitudinal direction of a first light sensor of the tracking device with respect to an offset between the first light sensor and a first mask;
      determining a second component of the three dimensional location of the selected mobile endpoint in the space based on the shadow cast by the optical tracking signal in a longitudinal direction of a second light sensor of the tracking device with respect to an offset between the second light sensor and a second mask;
      determining a third component of the three dimensional location of the selected mobile endpoint in the space based on an overall length of the shadow cast by the optical tracking signal; and
      determining the current three dimensional location of the selected mobile endpoint in the space based on the first, second and third components;
   steering an optical beam to the determined current location of the selected mobile endpoint; and
   transmitting the optical beam to the determined current location of the selected mobile endpoint to transmit an optical data signal to the selected mobile endpoint.

2. The method of claim 1, wherein
the second light sensor is positioned adjacent to the first light sensor, and orthogonal to the first light sensor.

3. The method of claim 1, wherein steering the optical beam to the determined current location of the selected mobile endpoint comprises:
   activating a laser of the base station to generate a beam including the optical data signal; and
   activating a steerer mechanism and steering the generated beam to the determined current location of the selected mobile endpoint.

4. The method of claim 3, wherein activating the steerer mechanism comprises one of:
   activating a spatial light modulator to modulate and steer the beam generated by the laser to the determined current location of the selected mobile endpoint; or
   rotating a pair of single axis mirrors to steer the beam generated by the laser to the determined current location of the selected mobile endpoint.

5. The method of claim 1, wherein transmitting the optical beam to the determined current location of the selected mobile endpoint to transmit the optical data signal to the selected mobile endpoint comprises:
   activating a light source of the base station to generate the optical beam;
   modulating the optical beam generated by the light source including the optical data signal; and
   transmitting the optical data signal from the base station to the determined current location of the selected mobile endpoint.

6. A system for automatically steering a wireless optical signal, the system comprising:
   a base station, including:
      a light source; and
      a steerer mechanism; and
   at least one mobile device located in a predetermined space and configured for wireless communication with the base station, the at least one mobile device including:
      a tracker device configured to receive an optical tracking signal from the light source of the base station, and to determine a current three dimensional position of the at least one mobile device in the predetermined space based on at least one component of the optical tracking signal sensed by the tracker device, the tracker device including:
         a first linear photo diode array;
         a first mask positioned at an offset relative to the first linear photo diode array, wherein the first photo diode array is configured to sense a first optical component of the optical tracking signal based on a shadow cast in the longitudinal direction of the first photo diode array and an offset between the first photo diode array and the first mask;
         a second linear photo diode array positioned adjacent to and orthogonal to the first linear photo diode array; and
         a second mask positioned at an offset relative to the second linear photo diode array, wherein the second photo diode array is configured to sense a second optical component of the optical tracking signal based on a shadow cast in the longitudinal direction of the second photo diode array and an offset between the second photo diode array and the second mask; and
      a transmitter device configured to transmit an optical data signal to the base station from the current three dimensional position of the at least one mobile device.

7. The system of claim 6, wherein the tracker device is configured to:
   determine a third component of the optical tracking signal based on an overall length of the shadow cast by the optical tracking signal; and
   determine the three dimensional position of the at least one mobile device in the predetermined space based on the first, second and third components.

8. The system of claim 6, wherein the light source of the base station includes a laser light source and the steerer mechanism of the base station includes a spatial light modulator configured to modulate and steer a beam generated by the laser light source to the current three dimensional position of the at least one mobile device in the predetermined space.

9. The system of claim 6, wherein the base station comprises a plurality of base stations positioned in the predetermined space and configured for wireless optical communication with a plurality of mobile devices in the predetermined space, each of the plurality of base stations including a laser light source configured to generate a beam including an optical data signal and a spatial light modulator configured to modulate and steer the beam to a current location of a corresponding mobile device of the plurality of mobile devices in the predetermined space.

10. The system of claim 9, wherein the plurality of base stations comprises a first base station having a first laser light source and a second base station having a second laser light source, wherein the first base station and the first laser light source are configured to transfer communication with a selected mobile device to the second base station and the second laser light source as the selected mobile device moves out of a range of the first base station and first laser light source and into a range of the second base station and second laser light source.

11. A non-transitory computer-readable storage medium storing instructions that, when executed, cause a computing device to perform a process, the instructions comprising instructions to:
   determine a current three dimensional location of a selected mobile endpoint of a plurality of mobile endpoints in a space, including instructions to:
      transmit a first optical tracking signal from a light source of a base station to a tracker device of the selected mobile endpoint;
      determine a first component of the first optical tracking signal based on a shadow cast by the first optical tracking signal along a longitudinal direction of a first linear photo diode array of the selected mobile endpoint with respect to an offset between the first linear photo diode array and a first mask;
      determine a second component of the first optical tracking signal based on the shadow cast by the first optical tracking signal along a longitudinal direction of a second linear photo diode array with respect to an offset between the second linear photo diode array and a second mask, the second linear photo diode array being positioned adjacent to and orthogonal to the first linear photo diode array;
      determine a third component of the first optical tracking signal based on an overall length of the shadow cast by the first optical tracking signal; and
      determine the current three dimensional position of the selected mobile endpoint in the space based on the first, second and third components; and
      receive a second optical tracking signal at the base station from the current three dimensional position of the selected mobile endpoint;
   steer an optical beam from the base station to the determined current location of the selected mobile endpoint; and
   transmit the optical beam from the base station to the determined current location of the selected mobile endpoint to transmit an optical data signal to the selected mobile endpoint.

12. The non-transitory computer-readable storage medium of claim 11, the instructions to steer the optical beam from the base station to the determined current location of the selected mobile endpoint including instructions to:
   activate a laser of the base station and generate a beam including the optical data signal; and
   activate a steerer mechanism and steer the generated beam to the determined current location of the selected mobile endpoint.

13. The non-transitory computer-readable storage medium of claim 11, the instructions to transmit the optical beam from the base station to the determined current location of the selected mobile endpoint to transmit the optical data signal to the selected mobile endpoint including instructions to:
   activate a light source of the base station;
   modulate the beam generated by the light source including the optical data signal; and
   transmit the optical data signal from the base station to the determined current location of the selected mobile endpoint.

14. The non-transitory computer-readable storage medium of claim 11, the instructions to steer an optical beam from the base station to the determined current location of the selected mobile endpoint including instructions to:
   activate a spatial light modulator to modulate and steer the optical beam to the determined current location of the selected mobile endpoint, or
   rotate a pair of single axis mirrors to steer the optical beam to the determined current location of the selected mobile endpoint.

15. A system for automatically steering a wireless optical signal, the system comprising:
   a plurality of base stations, including:
      a first base station including a first laser light source; and
      a second base station including a second laser light source;
   a plurality of mobile devices located in a predetermined space and configured for wireless communication with the plurality of base stations, each mobile device of the plurality of mobile devices including:
      a tracker device configured to receive optical tracking signals from the plurality of base stations, and to determine a current three dimensional position of the mobile device in the predetermined space based on at least one component of the optical tracking signals sensed by the tracker device; and
      a transmitter device configured to transmit optical data signals to the plurality of base stations from the current three dimensional position of the mobile device,
   wherein the first base station and the first laser light source are configured to transfer communication with a selected mobile device of the plurality of mobile devices to the second base station and the second laser light source as the selected mobile device moves out of a range of the first base station and first laser light source and into a range of the second base station and second laser light source.

16. The system of claim 15, wherein the tracker device of each mobile device of the plurality of mobile devices includes:
   a first linear photo diode array;
   a first mask positioned at an offset relative to the first linear photo diode array, wherein the first photo diode array is configured to sense a first optical component of the optical tracking signal based on a shadow cast in the longitudinal direction of the first photo diode array and an offset between the first photo diode array and the first mask;
   a second linear photo diode array positioned adjacent to and orthogonal to the first linear photo diode array; and
   a second mask positioned at an offset relative to the second linear photo diode array, wherein the second photo diode array is configured to sense a second optical component of the optical tracking signal based on a shadow cast in the longitudinal direction of the second photo diode array and an offset between the second photo diode array and the second mask.

17. The system of claim 15, wherein
the first base station includes a first spatial light modulator configured to modulate and steer a beam generated by the first laser light source to the current three dimensional position of the selected mobile device when the selected mobile device is within the range of the first base station; and
the second base station includes a second spatial light modulator configured to modulate and steer a beam generated by the second laser light source to the current three dimensional position of the selected mobile device when the selected mobile device is within the range of the second base station.

18. A method of steering an optical data signal from a base station, of a plurality of base stations, to a selected mobile endpoint, of a plurality of mobile endpoints, in a space, the method comprising:
determining a current three dimensional location of the selected mobile endpoint in the space;
determining, based on the determined current three dimensional location of the selected mobile endpoint in the space, that the selected mobile endpoint is within a range of a first base station of the plurality of base stations;
steering an optical beam from a first laser light source of the first base station to the determined current three dimensional location of the selected mobile endpoint within the range of the first base station;
transmitting the optical beam to the determined current location of the selected mobile endpoint within the range of the first base station to transmit an optical data signal to the selected mobile endpoint;
updating the current three dimensional location of the selected mobile endpoint in the space;
determining, based on the updated three dimensional location of the selected mobile endpoint in the space, that the selected mobile endpoint is within a range of a second base station of the plurality of base stations; and
transferring communication with the selected mobile endpoint from the first base station to the second base station in response to the determination that the selected mobile endpoint is within the range of the second base station.

19. The method of claim 18, wherein transferring communication with the selected mobile endpoint from the first base station to the second base station includes:
steering an optical beam from a second laser light source of the second base station to the updated three dimensional location of the selected mobile endpoint within the range of the second base station; and
transmitting the optical beam to the updated location of the selected mobile endpoint within the range of the second base station to transmit an optical data signal to the selected mobile endpoint.

* * * * *